United States Patent
Kim et al.

(10) Patent No.: US 12,244,020 B2
(45) Date of Patent: Mar. 4, 2025

(54) METHOD OF PRODUCING PLATINUM ALLOY CATALYST USING FORMATION OF CARBON PROTECTIVE LAYER

(71) Applicants: Hyundai Motor Company, Seoul (KR); Kia Corporation, Seoul (KR)

(72) Inventors: Hyun Ju Kim, Seoul (KR); Dong Yoon Shin, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 324 days.

(21) Appl. No.: 18/078,956

(22) Filed: Dec. 10, 2022

(65) Prior Publication Data
US 2023/0327136 A1    Oct. 12, 2023

(30) Foreign Application Priority Data

Apr. 8, 2022    (KR) .................. 10-2022-0043689

(51) Int. Cl.
    *H01M 4/86*    (2006.01)
    *H01M 4/88*    (2006.01)
    *H01M 4/92*    (2006.01)

(52) U.S. Cl.
    CPC ....... *H01M 4/8652* (2013.01); *H01M 4/8846* (2013.01); *H01M 4/8882* (2013.01); *H01M 4/926* (2013.01); *H01M 2250/20* (2013.01)

(58) Field of Classification Search
    CPC ........... H01M 2250/20; H01M 4/8652; H01M 4/8846; H01M 4/8882; H01M 4/926; Y02E 60/50
    See application file for complete search history.

(56) References Cited

U.S. PATENT DOCUMENTS

| | | | |
|---|---|---|---|
| 2015/0255802 A1* | 9/2015 | Kim | H01M 4/926 429/524 |
| 2018/0166698 A1* | 6/2018 | Kim | H01M 4/926 |

FOREIGN PATENT DOCUMENTS

| | | |
|---|---|---|
| KR | 10-2009-0104210 A | 10/2009 |
| KR | 10-2015-0105742 A | 9/2015 |

OTHER PUBLICATIONS

Jang, J. et al., "Hybrid PtCo Alloy Nanocatalysts Encapsulated by Porous Carbon Layers for Oxygen Reduction Reactions", Korean J. Mater. Res., vol. 28, No. 11 (2018) pp. 646-652.

* cited by examiner

*Primary Examiner* — Victoria H Lynch
(74) *Attorney, Agent, or Firm* — Fox Rothschild LLP (57) ABSTRACT

Disclosed is, inter alia, a method of producing a platinum alloy catalyst using a carbon protective layer. The method includes depositing a transition metal precursor on a Pt/C catalyst including a platinum component and a carbon carrier, placing carbon at the bottom of a reactor separately from the transition metal precursor-deposited Pt/C catalyst by a separation membrane; performing heat treatment on the inside of the; forming a Pt-M/C catalyst coated with a carbon protective layer by passing a gas product generated through thermal decomposition of the placed carbon through the separation membrane, and removing the carbon protective layer from the Pt-M/C catalyst by performing acid treatment on the carbon protective layer coated on the Pt-AMC catalyst.

13 Claims, 8 Drawing Sheets

METHOD OF PRODUCING PLATINUM ALLOY CATALYST USING FORMATION OF CARBON PROTECTIVE LAYER

CROSS-REFERENCE TO RELATED APPLICATION

This application claims under 35 U.S.C. § 119(a) the benefit of priority to Korean Patent Application No. 10-2022-0043689 filed on Apr. 8, 2022, the entire contents of which are incorporated herein by reference.

TECHNICAL FIELD

The present disclosure relates to a method of producing a platinum alloy catalyst using the formation of a carbon protective layer. The method may produce a platinum alloy catalyst having a surface coated with a thin carbon protective layer by using a gas such as CO and $CO_2$ generated during thermal decomposition of carbon component having low crystallinity to suppress the size growth of catalyst particles caused during heat treatment.

BACKGROUND

In general, polymer electrolyte membrane fuel cells (PEMFCs) in which electricity is generated using a stacked structure of unit cells each consisting of a membrane electrode assembly (MEA) and a separator (also referred to as a 'bipolar plate') are attracting attention as next-generation energy sources that can replace fossil energy due to their high energy efficiency and eco-friendly features.

Such an MEA typically includes an oxidation electrode (anode) (also referred to as a 'fuel electrode'), a reduction electrode (cathode) (also referred as an 'air electrode'), and a polymer electrolyte membrane therebetween.

When a fuel such as hydrogen gas is supplied to the oxidation electrode, hydrogen ions ($H^+$) and electrons ($e^-$) are generated by an oxidation reaction of hydrogen at the oxidation electrode, and the generated hydrogen ions and electrons are transferred to the reduction electrode through the polymer electrolyte membrane and an external circuit, respectively, so that oxygen supplied to the reduction electrode is reduced by combining with the transferred hydrogen ions and electrons to produce water.

Typically, the anode and the cathode include a catalyst for the oxidation reaction of hydrogen and the reduction reaction of oxygen, and the catalyst contains platinum nanoparticles or platinum-based alloy nanoparticles, for example, Pt/C made of carbon support nano-sized platinum.

Compared to a platinum catalyst, the above-mentioned platinum alloy catalyst for fuel cells can reduce the amount of platinum used and has the advantage of increased catalytic activity due to the alloying effect. However, due to heat treatment during synthesis process of a Pt alloy catalyst for increasing the alloying of the Pt alloy catalyst, a problem of durability deterioration may occur due to growth of catalyst particles, i.e., metal elution during the synthesis process, and in order to solve this problem, a polymer coating process for forming a carbon protective layer needs to be additionally performed.

However, in case of high capacity synthesis process, in this polymer coating process, it is difficult not only to uniformly coat the polymer, but also to completely remove the residual polymer and carbon protective layer through washing to remove the residual polymer and an ozone treatment, which results in interference with the activity of an oxygen reduction reaction (ORR) that occurs on the catalyst surface, thereby causing a decrease in the performance of a fuel cell.

SUMMARY

In preferred aspects, provided is a method of producing a platinum alloy catalyst having a surface coated with a thin carbon protective layer. The carbon protective layer may be formed by placing carbon with low crystallinity at the bottom of a reactor and passing gases such as CO and $CO_2$ generated during thermal decomposition of a carbon component having low crystallinity in the process of heat treatment through a separation membrane in the reactor to react with the surface of the platinum alloy catalyst. The thin carbon protective layer may be formed on the catalyst surface to suppress the size growth of catalyst particles during the heat treatment.

In an aspect of the present disclosure, provided is a method of producing a platinum alloy catalyst. The method may include: depositing a transition metal precursor on a platinum/carbon (Pt/C) catalyst including a platinum component and a carbon carrier; placing a carbon component at the bottom of a reactor separately from the transition metal precursor-deposited Pt/C catalyst by a separation membrane; forming a Pt-M/C catalyst coated with a carbon protective layer by performing heat treatment the inside of the reactor; forming a carbon protective layer on the Pt-M/C catalyst by passing a gas product generated through thermal decomposition of the carbon component through the separation membrane; and removing the carbon protective layer from the Pt-M/C catalyst by performing acid treatment on the carbon protective layer-coated Pt-M/C catalyst.

The term "platinum component" as used herein refers to a component essentially including at least one platinum element or more other forms of platinum (e.g., Pt-alloyed metals) or compounds combined with (e.g., carbon, oxygen, nitrogen, or the like). Preferably, the platinum component as used in a catalyst is elemental platinum.

The term "carbon carrier" as used herein refers to a material essentially including atomic carbon in a specific form (e.g., carbon nanostructure, carbon nanotube, carbon nanofibers, carbon nanocoil, or carbon nanocage) that serves suitably as a structural support for the substance loaded thereon. Preferably, the carbon carrier is resistant to a heat-treatment due to high crystallinity.

The term "carbon component" as used herein refers to a material essentially including atomic carbon in any form (e.g., graphite, coal, graphene, amorphous carbon, carbon nanotube, organic carbons) or compound forms (e.g., organic compounds or inorganic compounds). Preferably, the carbon component may include carbon greater than about 80 wt %, greater than about 85 wt %, greater than about 90 wt %, greater than about 95 wt %, or greater than about 99 wt %, based on the total weight of the carbon component. Preferably, the carbon component as used in the heat-treatment may have low crystallinity such that it may be easily transformed into a gas product (e.g., CO or $CO_2$).

The crystallinity of the carbon component may be less than that of the carbon carrier of the Pt/C catalyst, and may have a carbon purity of about 95% or greater.

The separation membrane may be a porous silicone membrane.

The separation membrane may permeate only the gas product.

The heat treatment may be carried out at a temperature of about 900° C. to 950° C. under an inert gas atmosphere for about 1 hour or more and less than 3 hours.

The inert gas may have the hydrogen content of about 3% to 10% by volume.

The inert gas may be argon.

The carbon protective layer may be removed by the acid treatment using nitric acid, sulfuric acid, or a mixture of sulfuric acid/acetic acid.

The transition metal may suitably include one or more elements selected from a group including nickel (Ni), palladium (Pd), copper (Cu), silver (Ag), gold (Au), titanium (Ti), zirconium (Zr), vanadium (V), chromium (Cr), iron (Fe), ruthenium (Ru), cobalt (Co), and rhodium (Rh).

The transition metal may suitably include nickel (Ni).

In another aspect, provided is a platinum alloy catalyst produced by the methods as described herein.

Further provided is a fuel cell including the platinum alloy catalyst as described herein.

Also provided is a vehicle including the fuel cell as described herein.

According to various exemplary embodiments of the present disclosure, carbon with low crystallinity is placed at the bottom of the reactor so that gases such as CO and $CO_2$ generated during thermal decomposition of the carbon component with low crystallinity in the process of heat treatment passes through the separation membrane in the reactor to react with the surface of the platinum alloy catalyst to form the relatively-thin carbon protective layer on the catalyst surface. As such, the size growth of catalyst particles caused during the heat treatment may be suppressed.

Therefore, according to various exemplary embodiments of the present disclosure, since the carbon protective layer improving the durability of the catalyst is formed by carbonizing carbon with low crystallinity, the carbon protective layer can be easily removed, thereby providing the effect of eliminating an unnecessary washing process, such as ozone treatment for removing the carbon protective layer.

Further, according to various exemplary embodiments of the present disclosure, since the carbon protective layer formed on the catalyst can be completely removed with an acid treatment using such as nitric acid or sulfuric acid, the activity of the oxygen reduction reaction (ORR) occurring on the surface of the catalyst is maintained, thereby providing the effect of preventing the performance deterioration of the catalyst, and further the fuel cell.

Other aspects of the invention are disclosed infra.

DETAILED DESCRIPTION

The above objectives, other objectives, features, and advantages of the present disclosure will be easily understood through the following preferred embodiments in conjunction with the accompanying drawings. However, the present disclosure is not limited to the embodiments described herein and may be embodied in other forms. Instead, the embodiments introduced herein are provided so that the disclosed content may be thorough and complete, and the spirit of the present disclosure may be sufficiently conveyed to those skilled in the art.

Similar reference numerals were used for similar components while explaining each drawing. In the accompanying drawings, the dimensions of the structures are enlarged than the actual size for clarity of the present disclosure. Terms such as first, second, etc., may be used to describe various elements, but the elements should not be limited by the terms. The above terms are used only for the purpose of distinguishing one component from another. For example, without departing from the scope of the present invention, a first component may be referred to as a second component, and similarly, a second component may also be referred to as a first component. The singular expression includes the plural expression unless the context clearly dictates otherwise.

In the present specification, it should be understood that the term "including" or "have" is intended to specify that features, numbers, steps, operations, components, parts, or a combination of them are described in the specification and does not preclude the presence or addition of one or more other features, numbers, steps, operations, elements, or combinations thereof. In addition, when a part such as a layer, film, region, plate, etc. is said to be "on" another part, this includes not only "directly above" the other part, but also the case where there is another part between them. Conversely, when a part such as a layer, film, region, plate, etc., is said to be "below" the other part, this includes not only the case where the other part is "directly below", but also the case where there is another part between them.

Unless otherwise specified, all numbers, values, and/or expressions expressing quantities of ingredients, reaction conditions, polymer compositions, and formulations used herein contain all numbers, values, and/or expressions in which such numbers essentially occur in obtaining such values, among others. Since they are approximations reflecting various uncertainties in the measurement, it should be understood as being modified by the term "about" in all cases. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Also, where the present disclosure discloses numerical ranges, such ranges are continuous and inclusive of all values from the minimum to the maximum inclusive of the range, unless otherwise indicated. Furthermore, when such ranges refer to integers, all integers inclusive from the minimum to the maximum inclusive are included, unless otherwise indicated. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between valid integers within the stated range, such as 5.5, 6.5, 7.5, 5.5 to 8.5, 6.5 to 9, and the like. Also, for example, the range of "10% to 30%" will be understood to include subranges, such as 10% to 15%, 12% to 18%, 20% to 30%, etc., as well as all integers including values of 10%, 11%, 12%, 13% and the like up to 30%, and will also be understood to include any value between valid integers within the stated range, such as 10.5%, 15.5%, 25.5%, and the like.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, exemplary embodiments according to the present disclosure will be described in detail with reference to the accompanying drawings.

Advantages and features of the present disclosure, and a method of achieving the same will become apparent when referring to embodiments described below in detail in conjunction with the accompanying drawings.

However, the present disclosure is not limited to embodiments disclosed below, but will be implemented in a variety of different forms. These embodiments are merely provided to allow the present disclosure to be complete and to also fully inform an ordinary skilled person in the art, to which the present disclosure pertains, of the scope of the present disclosure. The present disclosure is only defined by the scope of the claims.

In addition, in describing the present disclosure, if relevant known technologies are determined to make the gist of the present disclosure obscure, a detailed description thereof will be omitted.

Figure 1:
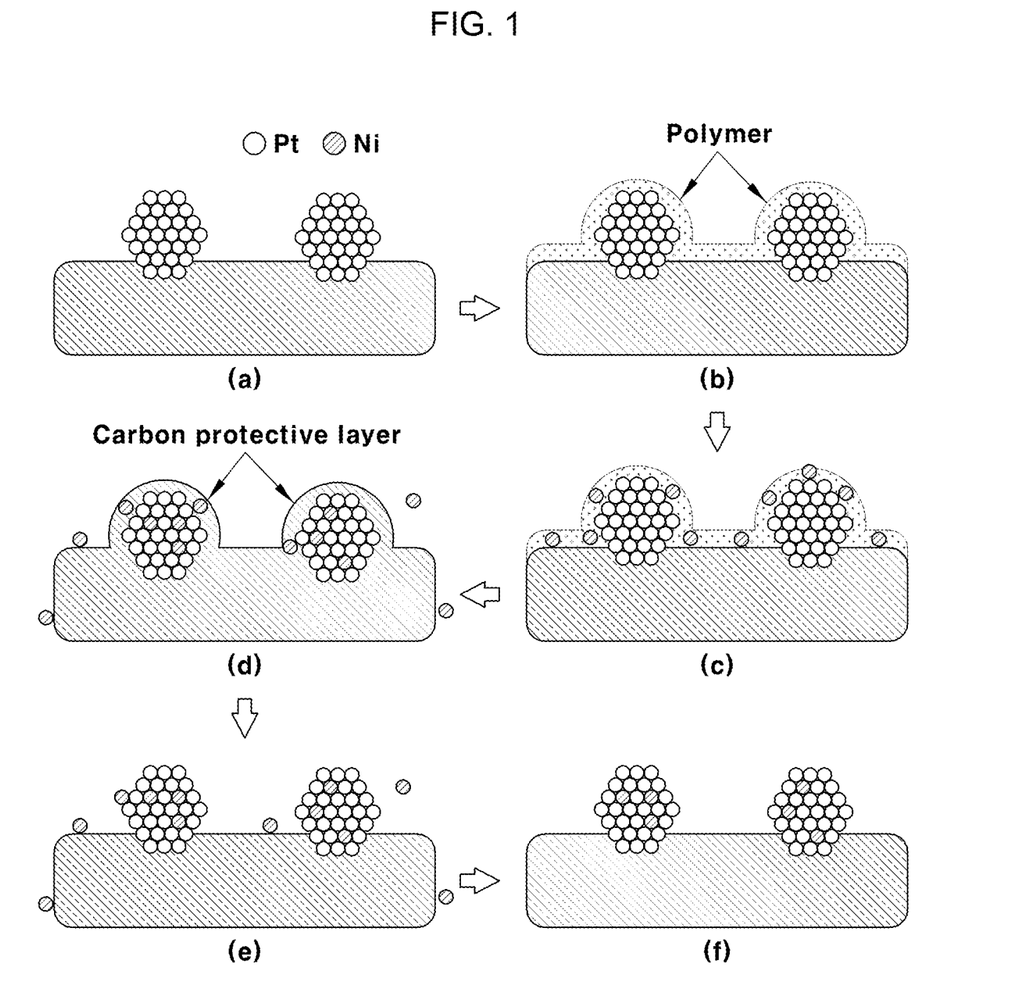
FIG. 1 shows a method of producing a platinum alloy catalyst in steps of (a) to (f) with a carbon protective layer formed according to the conventional process.
Figure 2:
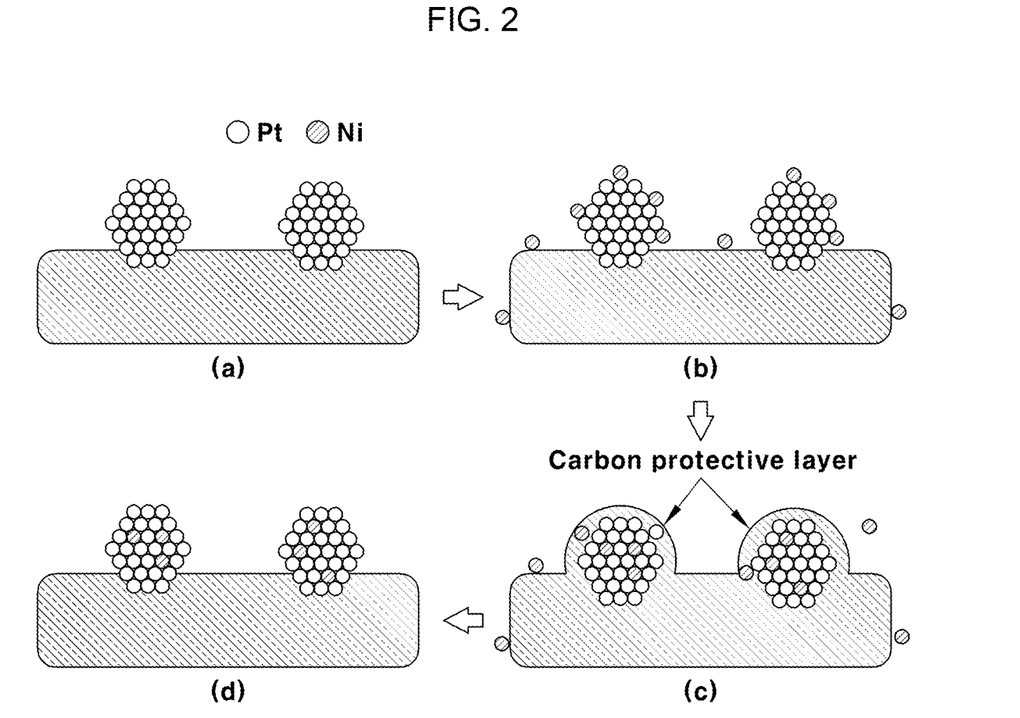
FIG. 2 shows an exemplary method of producing a platinum alloy catalyst with a carbon protective layer formed in steps of (a) to (d) according to an exemplary embodiment of the present disclosure.
Figure 3:
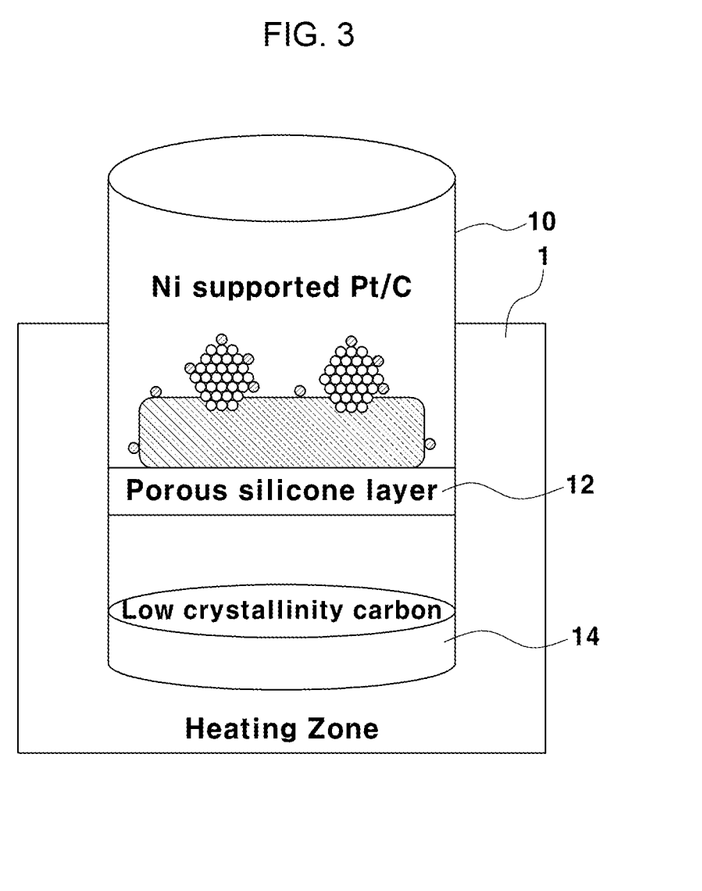
FIG. 3 shows an exemplary process of adding a carbon component in the process of producing the platinum alloy catalyst with the carbon protective layer formed according to an exemplary embodiment of the present disclosure.

FIG. 1 shows a method of producing a platinum alloy catalyst with a carbon protective layer formed in steps (a) to (f) according to the conventional process, FIG. 2 shows an exemplary method of producing a platinum alloy catalyst with a carbon protective layer formed in steps (a) to (d) according to an exemplary embodiment of the present disclosure, and FIG. 3 is a diagram illustrating the addition of carbon in the process of producing the platinum alloy catalyst with the carbon protective layer formed according to an exemplary embodiment of the present disclosure.

Figure 4:
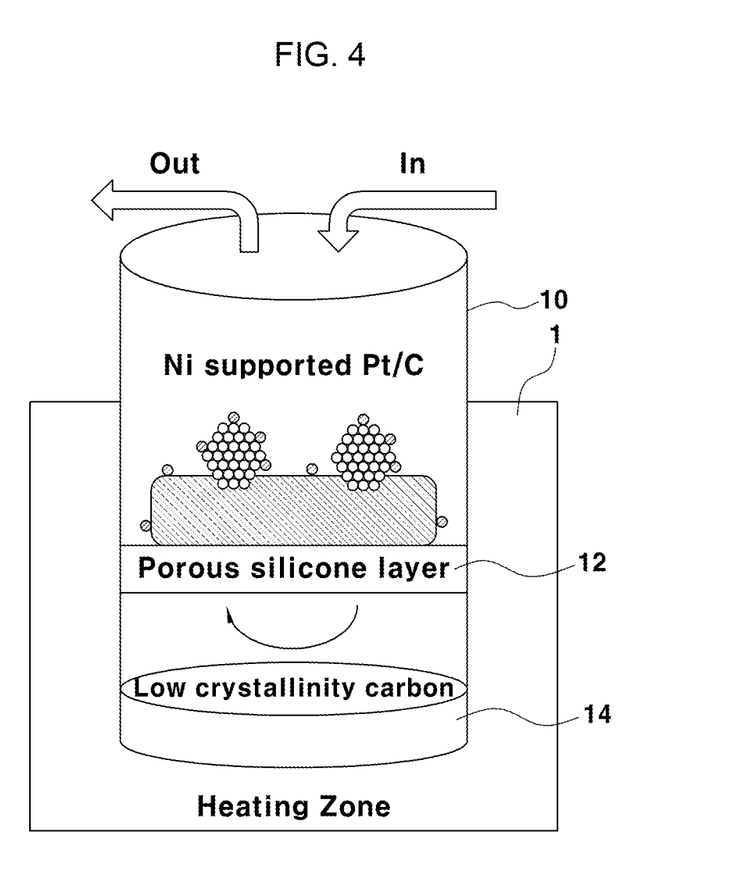
FIGS. 4 to 6 show steps of forming the carbon protective layer in the process of producing the platinum alloy catalyst according to an exemplary embodiment of the present disclosure.
Figure 5:
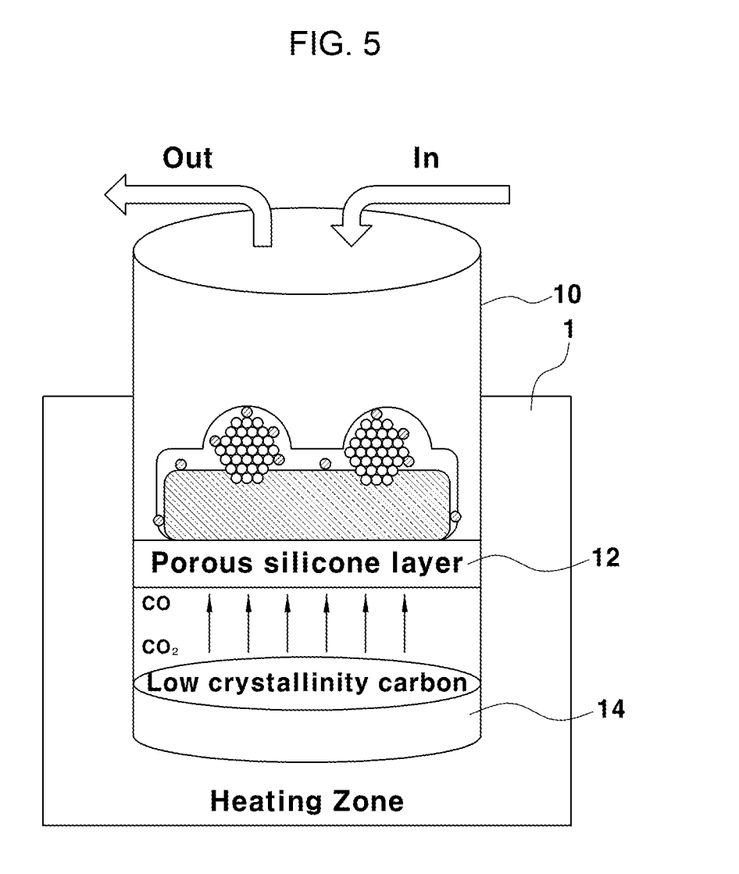
Figure 6:
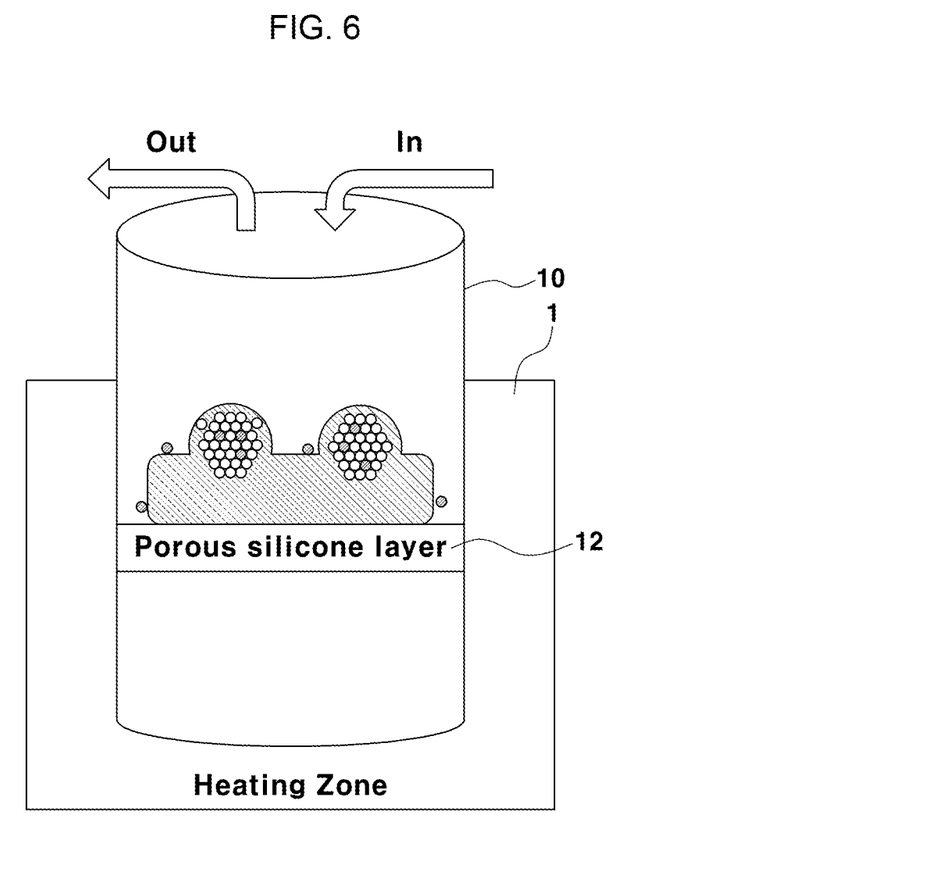
Figure 7:
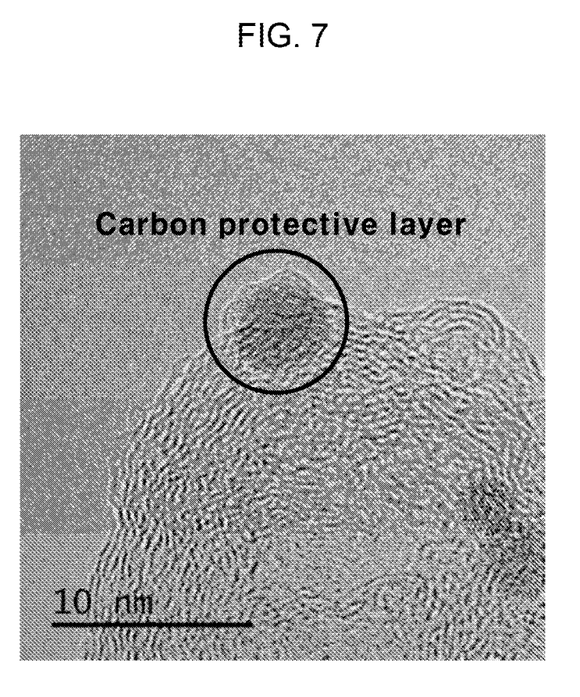
FIG. 7 is a microscopic photograph illustrating a carbon protective layer formed by the method of producing the platinum alloy catalyst according to the conventional process.
Figure 8:
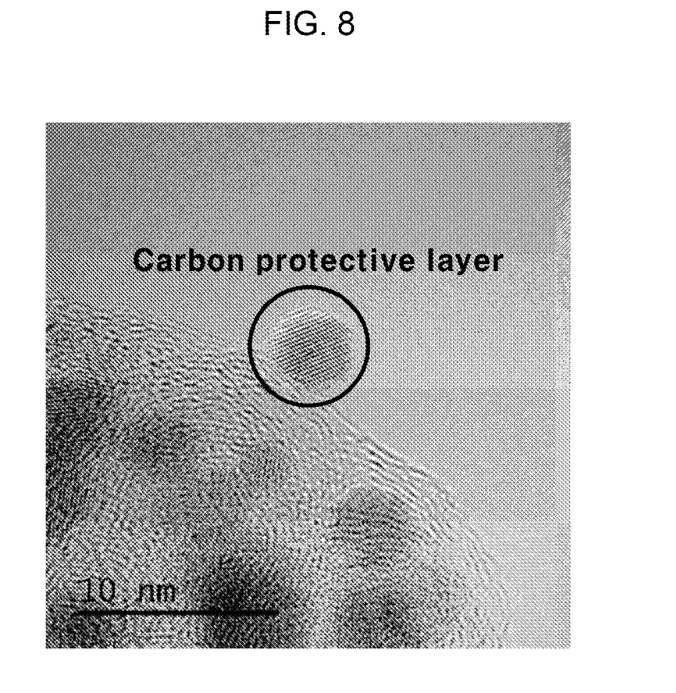
FIG. 8 is a microscopic photograph illustrating a carbon protective layer formed by the method of producing the platinum alloy catalyst according to an exemplary embodiment of the present disclosure.

FIGS. 4 to 6 are diagrams sequentially illustrating the carbon protective layer formed to be used in the process of producing the platinum alloy catalyst according to exemplary embodiments of the present disclosure, FIG. 7 is a microscopic photograph illustrating a carbon protective layer formed by the method of producing the platinum alloy catalyst according to the conventional process, and FIG. 8 is a microscopic photograph illustrating a carbon protective layer formed by the method of producing the platinum alloy catalyst according to an exemplary embodiment of the present disclosure.

As illustrated in FIG. 1 in the conventional method of producing a platinum alloy catalyst using a carbon protective layer formed according to the convention process, an organic polymer is coated on a Pt/C catalyst in which platinum is supported on a carbon carrier, the coated Pt/C catalyst is heat-treated after a transition metal precursor is deposited thereon to form a carbon layer-coated catalyst, and then ozone treatment and acid treatment are sequentially performed to remove the coated organic polymer and the carbon layer.

That is, the conventional method of producing the platinum alloy catalyst briefly includes a process of heat-treating a catalyst coated with an organic polymer in a hydrogen-free atmosphere to prepare a catalyst coated with a carbon layer, and a process of performing ozone treatment and acid treatment to remove the carbon layer. One of the conventional methods of producing a platinum alloy may be a precursor deposition method.

This precursor deposition method is a method of preparing an alloy catalyst by first supporting platinum on a carbon carrier, mixing the same with a precursor of a desired alloying element, and then performing a high-temperature heat treatment thereof to produce an alloy catalyst.

However, according to the present disclosure, as shown in FIG. 2, the process of coating a catalyst, in which platinum or platinum and a transition metal are supported on a carbon carrier, with an organic polymer (polymer coating) and the ozone treatment process (see FIG. 1) may be omitted, and a carbon component with low crystallinity may be placed and a carbon protective layer is formed using the carbon component, so that it is possible to eliminate an unnecessary washing processes such as conventional ozone treatment to remove the carbon protective layer.

In other words, conventionally, as illustrated in FIG. 1, dispersion of Pt/C (a) in which platinum is supported on a carbon carrier, polymer coating (b), support of a transition metal precursor (c), heat treatment (d), ozone treatment (e), and acid treatment (f) were sequentially performed to prepare a platinum alloy catalyst. In contrast, as shown in FIG. 2, dispersion of Pt/C (a), support of a transition metal precursor (b), heat treatment (c), and acid treatment (d) are sequentially performed to prepare a platinum alloy catalyst with a minimized number of processes compared to the conventional method.

Further, as shown in FIG. 3, a method of producing a platinum alloy catalyst in a reactor 10 provided in a furnace 1 for heat treatment will be sequentially described with reference to FIGS. 4 to 6.

A transition metal precursor is deposited on a Pt/C catalyst in which platinum is supported on a carbon carrier.

The transition metal (M) may include a transition metal element on the periodic table, for example, one or more elements selected from a group including nickel (Ni), palladium (Pd), copper (Cu), silver (Ag), gold (Au), titanium (Ti), zirconium (Zr), vanadium (V), chromium (Cr), iron (Fe), ruthenium (Ru), cobalt (Co) and rhodium (Rh), or particularly, nickel (Ni).

In addition, the transition metal (M) may be used in the form of a salt, which may be selected from nitrate, sulfate, acetate, chloride, and oxide.

In addition, the carrier used in preparing the platinum alloy catalyst may be a carbon carrier used as a support capable of supporting a metal, and this carbon carrier may suitably include at least one selected from a group consisting of carbon black and crystalline carbon. Here, the crystalline carbon may be selected from a group consisting of carbon nanotubes (CNT), carbon nanofibers (CNF), carbon nanocoils, and carbon nanocages (CNC), but in this embodiment, there is no particular limitation on the selection of the carbon carrier.

Thereafter, as shown in FIG. 4, carbon 14 having low crystallinity may be placed at the bottom of a reactor 10 to be separated from the Pt/C catalyst on which the transition metal precursor, that is, nickel (Ni), is deposited through a separation membrane 12, and then heat treatment may be performed in a state in which an inert gas, for example, argon (Ar), may be purged for about 1 hour or more in order to make the inside of the reactor 10 into an inactive state before the temperature is increased.

The crystallinity of the carbon placed at the bottom of the reactor 10 should be lower than that of the carbon carrier of the Pt/C catalyst, and in order to exclude by-products other than CO and $CO_2$ from the gaseous products generated during thermal decomposition, organic impurities other than carbon should be minimized. The carbon purity may be preferably of 95% or greater.

In addition, the separation membrane 12 may suitably include a porous silicone membrane, which may prevent the floating carbon from being mixed with the Pt/C catalyst before the heat treatment and to allow gaseous products such as CO and $CO_2$ generated during thermal decomposition to pass therethrough during the heat treatment, since the carbon 14 with low crystallinity is generally light.

As shown in FIG. 5, when the heat treatment proceeds in a state in which the inside of the reactor 10 is inactivated, the low crystallinity carbon 14 may be thermally decomposed, and gas products such as CO and $CO_2$ generated at this time can pass through the porous silicone membrane.

Accordingly, as shown in FIG. 6, CO and $CO_2$ generated through thermal decomposition react with the Pt/C catalyst surface to prepare a Pt-M/C catalyst with a carbon protective layer formed thereon. The carbon protective layer formed in this manner was similar to the carbon protective layer (see FIG. 7) formed through the conventional polymer coating process. Particularly, although there was a difference in particle size, the carbon protective layer was formed through thermal decomposition of the low crystallinity carbon 14 even though the polymer coating process is deleted (see FIG. 8). Eventually, the growth of catalyst particles was suppressed by the carbon protective layer, so that the alloying of the Pt—Ni catalyst will be performed in the same level (a ratio of Ni:Pt is approximately 8:2) as the conventional alloying of the Pt—Ni catalyst.

Preferably, the heat treatment may be performed at a temperature of about 900° C. to 950° C. under an inert gas atmosphere for about 1 hour or more and less than 3 hours. When the heat treatment is performed for 3 hours or more by thermal decomposition, not only the carbon protective layer is lost from the Pt-M/C catalyst, but also particles in the catalyst are coarsened. In addition, for the formation of the catalyst alloy, hydrogen flowing in the reactor 10, or in other words, hydrogen contained in argon (Ar), which is an inert gas, may preferably have the content limited to less than about 3% to 5% by volume for safety reasons.

As shown in FIG. 6, the Pt-M/C catalyst coated with the carbon protective layer may be acid-treated to finally produce a carbon-supported platinum alloy catalyst (Pt—Ni/C) in which the carbon protective layer was removed from the Pt-MIC catalyst as illustrated in FIG. 2 in the step (d).

The acid treatment may be performed to remove impurities and added carbon with low crystallinity after heat treatment. The type of acid used may be nitric acid, sulfuric acid, a mixture of sulfuric acid/acetic acid, etc., and according to the set conditions, secondary acid treatment may be performed after the primary acid treatment.

In addition, the acid concentration may have a range of about 0.5 to 6M, and the acid treatment time may be varied depending on the concentration. However, the acid treatment may be performed for about 2 to 6 hours to suppress additional carbon corrosion.

The conventional method performs ozone treatment (see FIG. 1, step (e)) to remove the carbon protective layer coated on the catalyst surface during heat treatment. To the contrary, as shown in FIG. 2, since the carbon protective layer is formed on the catalyst surface through thermal decomposition of low crystallinity carbon component, unlike the protective layer formed of polymer in the conventional method above, the carbon protective layer may be sufficiently removed only by acid treatment without ozone treatment. Accordingly, the introduction of an unnecessary washing processes such as ozone treatment, etc may be eliminated.

Therefore, according to an exemplary embodiment of the present disclosure, since the carbon protective layer can be completely removed through acid treatment, the activity of the oxygen reduction reaction (ORR) occurring on the catalyst surface is maintained so that deterioration in the catalyst performance and thus in the fuel cell performance can be prevented.

Further, while in the conventional polymer coating (see FIG. 1, step (b)), during high capacity synthesizing, it is difficult to uniformly coat a polymer, and there was a problem of durability and performance decrease due to the polymer remaining after washing, in the embodiment, since the polymer coating itself is removed, that is, the carbon protective layer is formed by thermal decomposition of low crystallinity carbon, rather than by carbonization of the polymer coated on the catalyst surface, it is possible to form a similar level carbon protective layer with reduced number of processes compared to the conventional method.

According to various exemplary embodiments of the present disclosure, the carbon component with low crystallinity may be placed at the bottom of the reactor, so that gases such as CO and $CO_2$ generated during thermal decomposition of the carbon component in the process of heat treatment passes through the separation membrane in the reactor to react with the surface of the platinum alloy catalyst to form the relatively-thin carbon protective layer on the catalyst surface, which makes it possible to suppress the size growth of catalyst particles caused during the heat treatment.

Therefore, according to various exemplary embodiments of the present disclosure, since the carbon protective layer improving the durability of the catalyst is formed by carbonizing carbon with low crystallinity, the carbon protective layer can be easily removed, thereby providing the effect of eliminating an unnecessary washing process, such as ozone treatment for removing the carbon protective layer.

Further, according to various exemplary embodiments of the present disclosure, since the carbon protective layer formed on the catalyst can be completely removed with an acid treatment using such as nitric acid or sulfuric acid, the activity of the oxygen reduction reaction (ORR) occurring on the surface of the catalyst is maintained, thereby providing the effect of preventing the performance deterioration of the catalyst, and further the fuel cell.

While the present disclosure has been described with reference to the exemplary embodiment(s) illustrated in the drawings, this is merely illustrative, and it is understood by those skilled in the art that various modifications may be made therefrom, and some or all of the above-described embodiments may optionally be combined. Accordingly, the true technical protection scope of the present disclosure should be defined by the technical spirit of the appended claims.

What is claimed is:

1. A method of producing a platinum alloy catalyst, comprising:
   depositing a transition metal precursor on a platinum/carbon (Pt/C) catalyst comprising a platinum component and a carbon carrier;
   adding a carbon component at the bottom of a reactor as separated by a separation membrane from the Pt/C catalyst thus deposited with the transition metal precursor;
   performing heat treatment inside of the reactor;
   forming a Pt-M/C catalyst coated with a carbon protective layer by passing a gas product generated from thermal decomposition of the carbon component through the separation membrane; and
   removing the carbon protective layer from Pt-M/C catalyst by performing acid treatment on the carbon protective layer-coated Pt-M/C catalyst wherein the carbon protective layer is removed from the Pt-M/C catalyst.

2. The method according to claim 1, wherein a crystallinity of the carbon component is less than a crystallinity of the carbon carrier of the Pt/C catalyst, and has a carbon purity of 95% or greater.

3. The method according to claim 1, wherein the separation membrane is a porous silicone membrane.

4. The method according to claim 1, wherein the separation membrane permeates only the gas product.

5. The method according to claim 1, wherein the heat treatment is performed at a temperature of about 900° C. to 950° C. under an inert gas atmosphere for about 1 hour or more and less than about 3 hours.

6. The method according to claim 5, wherein the inert gas has a hydrogen content of about 3% to 10% by volume.

7. The method according to claim 6, wherein the inert gas is argon.

8. The method according to claim 1, wherein the carbon protective layer is removed by the acid treatment using nitric acid, sulfuric acid, or a mixture of sulfuric acid/acetic acid.

9. The method according to claim 1, wherein the transition metal comprises one or more elements selected from a group including nickel (Ni), palladium (Pd), copper (Cu), silver (Ag), gold (Au), titanium (Ti), zirconium (Zr), vanadium (V), chromium (Cr), iron (Fe), ruthenium (Ru), cobalt (Co), and rhodium (Rh).

10. The method according to claim 9, wherein the transition metal comprises nickel (Ni).

11. A platinum alloy catalyst produced by a method of claim 1.

12. A fuel cell comprising a platinum alloy catalyst of claim 11.

13. A vehicle comprising a fuel cell of claim 12.

* * * * *